United States Patent [19]

Dittman et al.

[11] 4,297,622

[45] Oct. 27, 1981

[54] MOTOR DRIVE

[75] Inventors: Charles C. Dittman, Dallas, Tex.; Richard C. St. Clair, Ridgecrest, Calif.

[73] Assignee: The United States of America as represented by the Secretary of the Navy, Washington, D.C.

[21] Appl. No.: 88,498

[22] Filed: Oct. 26, 1979

[51] Int. Cl.³ .............................................. H02K 29/02
[52] U.S. Cl. .................................... 318/254; 318/138
[58] Field of Search .............. 318/254, 138; 74/5.6 D, 74/5.6 E, 5.7

[56] References Cited

U.S. PATENT DOCUMENTS

| | | | |
|---|---|---|---|
| 3,282,081 | 11/1966 | Boskovich et al. | 74/5.6 D |
| 3,412,618 | 11/1968 | Staats | 74/5.7 |
| 3,617,841 | 11/1971 | Brailsford | 318/254 |
| 3,656,040 | 4/1972 | Babikyan | 318/489 |
| 3,775,648 | 11/1973 | Brown et al. | 318/138 |
| 3,783,357 | 1/1974 | Ichiyanage | 318/254 |
| 3,794,895 | 2/1974 | Coupin et al. | 318/254 |
| 3,961,211 | 6/1976 | Vergues | 318/438 |
| 3,999,108 | 12/1976 | Tanikoshi | 318/138 |
| 4,008,426 | 2/1977 | Dickey | 318/254 |
| 4,065,706 | 12/1977 | Gosling et al. | 318/254 |
| 4,131,828 | 12/1978 | Houshi | 318/138 |

Primary Examiner—David Smith, Jr.
Attorney, Agent, or Firm—R. S. Sciascia; W. Thom Skeer; Kenneth G. Pritchard

[57] ABSTRACT

A gyro motor drive speed control system using reference coils in place of saturable reactors for motor start up and spin direction. An oscillator provides a 1 $H_z$ squarewave signal to rotate the motor magnet in some direction, and movement of the magnet causes a magnetic field disturbance which induces a current into the reference coils. The signals from the reference coils are fed back into the oscillator and through a phase shifting and squaring network, with one reference signal shifted 90° out of phase. The multiplied output signals are fed into a circuit for motor drive and speed control. If the magnet begins to spin in the wrong direction, the quadratured lead-lag signals will be reversed, acting against the magnet, causing it to stop and reverse direction.

3 Claims, 2 Drawing Figures

MOTOR DRIVE

BACKGROUND OF THE INVENTION

1. Field of the Invention:

This invention pertains to motor drive speed control systems. Specifically it pertains to gyro motors using reference coils in place of saturable reactors for motor start up and spin direction.

2. Description of the Prior Art:

Saturable reactors in previous motor drives determined the position of the magnet for application of two phase drive signals during start up and running. Reference coils can only do this if the magnet is in motion. When both sets of reference coils are used independently, the gyro is capable of spinning in either direction with equal preference.

Saturable reactors require matched sets of four with close tolerances for proper operation. Elimination of saturable reactors both reduces cost and eases the burden of construction required by their use.

SUMMARY OF THE INVENTION

A gyro motor drive arrangement utilizes two series connected reference coils located 180 degrees apart. The reference coils are within the gyro and at a fixed rotational angle relative to one of the two phase gyro drive coils. The permanent magnet rotor axis is captured by a pivot at one end only. This allows the stator to be precessed or tilted by other means while rotating under control of the motor drive.

DESCRIPTION OF THE PREFERRED EMBODIMENT

Figure 1:
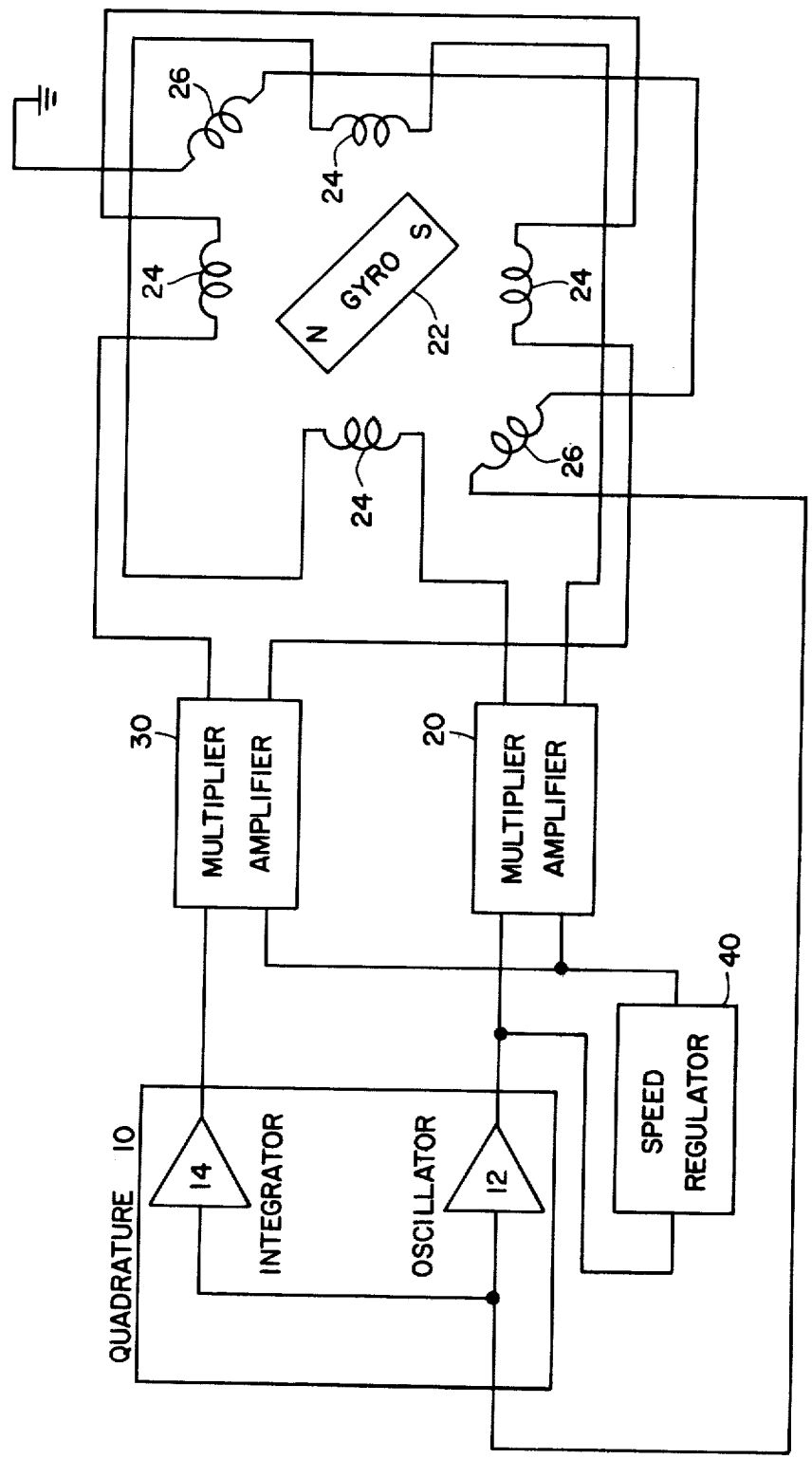
FIG. 1 is a block diagram of the present invention.

FIG. 1 has a quadrature section 10 which provides an initial pulse from oscillator 12. The pulse from oscillator 12 is passed through a multiplier/amplifier 20 to obtain predetermined characteristics. The output of multiplier/amplifier 20 is fed to motor drive coils 24 which surround a gyro magnet 22.

Once gyro magnet 22 is in motion, reference coils 26 will sense the changing magnetic field as is well known in the art. The current induced by reference coils 26 is fed back to quadrature section 10 where it is divided between oscillator 12 and an integrator 14.

Integrator 14 emits a shifted signal through multiplier/amplifier 30 which aids drive coils 24. A speed regulator 40 is connected between oscillator 12 and multiplier/amplifiers 20 and 30 to maintain the desired spin rate of gyro magnet 22.

Figure 2:
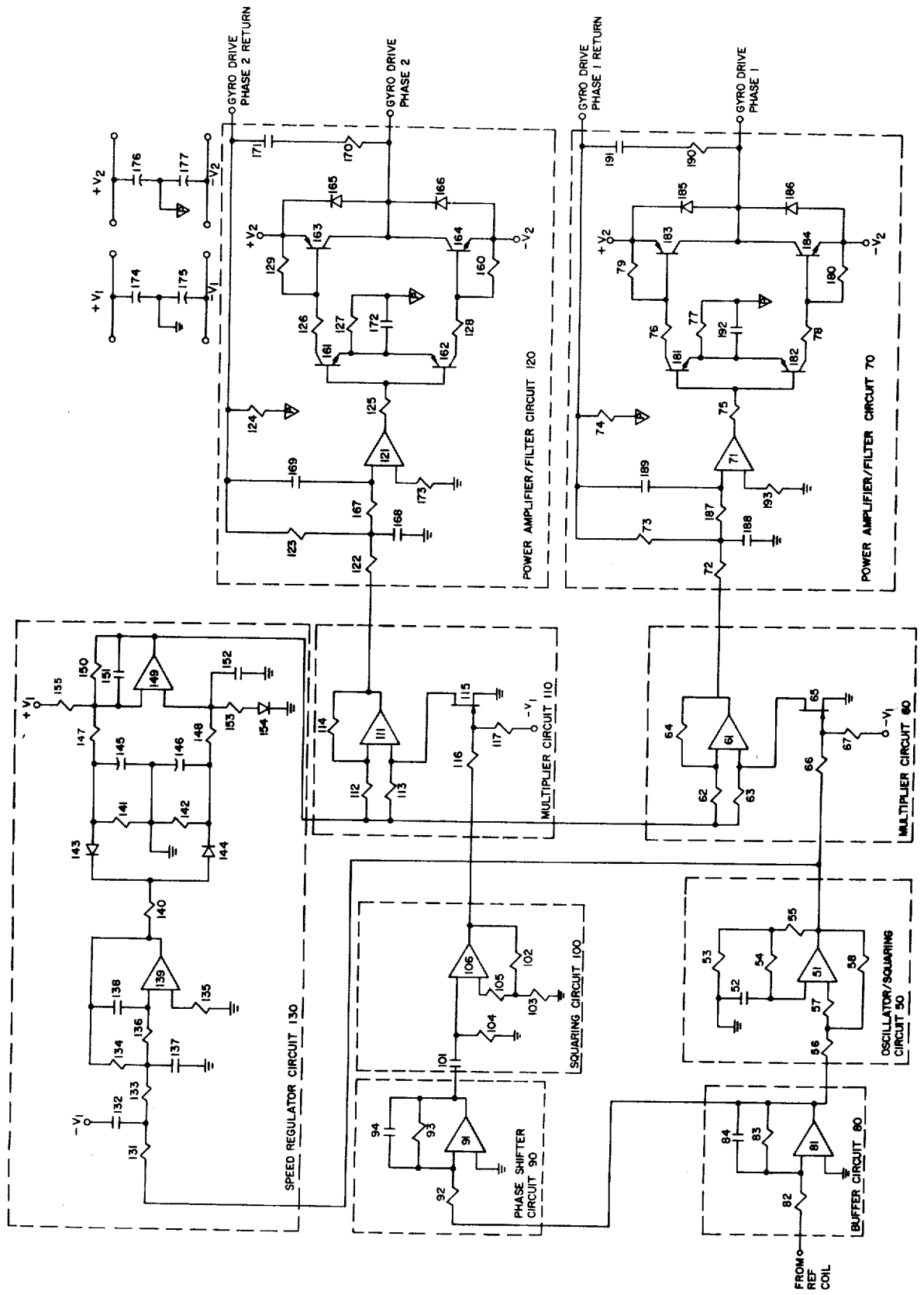
FIG. 2 is a circuit diagram of the present invention.

FIG. 2 is a circuit diagram of the block diagram shown in FIG. 1. Referring to FIG. 2, with the application of power an oscillator/squaring circuit 50 acts as a square wave oscillator with a frequency below one Hz. Components 51, 52, 53, 54, 55, 56, 57 and 58 determine the frequency of oscillation. The square wave signal from oscillator/squaring circuit 50 is fed via a multiplier circuit 60 and power amplifier/filter circuit 70 to the phase 1 gyro drive coils. This amplifier, low frequency oscillation perturbates the gyro and sets it in motion. This motion is sensed by reference coils 26 shown in FIG. 1, and a signal is returned to a buffer circuit 80 where it is amplified by an amount determined by components 81, 82 and 83. Components 84 and 83 also provide filtering to eliminate high frequency noise pickup.

The signal from buffer circuit 80 is fed to oscillator/squaring circuit 50. Because the signal amplitude from buffer circuit 80 caused by the small motion of the gyro is below a threshold value defined by resistor components 56 and 58 in oscillator/squaring circuit 50, it has no effect on the oscillator/squaring circuit 50 which continues to oscillate at a frequency below one Hz.

The signal from buffer circuit 80 is also fed to a phase shifter circuit 90 which provides an extremely high gain and a 90 degree phase shift for frequencies well below one Hz. Components 91, 92, 93 and 94 control the gain and phase. The output of phase shifter circuit 90 is squared by a squaring circuit 100. A capacitor 101 removes any DC offset in the signal and resistors 102 and 103 establish a threshold for the squaring circuit. Resistors 104 and 105 provide matching bias current paths for amplifier 106.

The square wave output from squaring circuit 100 is fed via a multiplier circuit 116 and a power amplifier/filter circuit 120 to the phase 2 gyro drive coils. The phase 2 gyro drive controls are set at a predetermined phase difference, such as 90°, from the phase 1 gyro drive controls. This signal will aid the motion of the gyro caused by the perturbation in phase 1 if that motion is in the correct direction, and oppose the motion if it is in the wrong direction. If the gyro motion is in the correct direction, the phase 2 signal will quickly accelerate the gyro spin toward the desired spin frequency. If the gyro motion is in the wrong direction, the phase 2 signal will deccelerate the gyro and reverse its direction and then accelerate it toward the desired spin frequency. As the gyro accelerates toward the desired spin frequency the signal returned to buffer circuit 80 increases in amplitude and frequency, thereby causing the output of buffer circuit 80 to increase in amplitude and frequency. When this amplitude becomes sufficient to exceed the threshold defined by resistor components 56 and 58 in oscillator/squaring circuit 50, oscillator/squaring circuit 50 will no longer act as a low frequency oscillator but changes to a squaring circuit, squaring up the output of buffer circuit 80. This squared up signal from oscillator/squaring circuit 50 is again fed via multiplier circuit 60 and power amplifier/filter circuit 70 to the phase 1 gyro drive coils where it reinforces phase 2 and helps to further accelerate the gyro toward the desired spin frequency.

The squared up signal from oscillator/squaring circuit 50 is also fed to a speed regulator circuit 130. In speed regulator circuit 130 the signal passes through a passive single pole low pass filter consisting of a "speed adjust" resistor 131 and capacitor 132, a two pole active low pass filter consisting of components 133, 134, 135, 136, 137, 138 and 139, a positive and negative peak detection circuit consisting of resistors 140, 141, 142, 143, 144, capacitors 145 and 146 and into a buffer amplifier consisting of components 147, 148, 149, 150, 151 and 152. Temperature compensation of the speed regulator circuit is provided by 153 and 154. If the corner frequency of the filter in speed regulator circuit 130 is set just below the desired spin frequency of the gyro, the output of speed regulator circuit 130 will be a DC voltage proportional to gyro speed. By the summation of a DC bias through 149 vice 199 the output of speed regulator circuit 130 becomes a bipolar error signal proportional to gyro speed. The output of speed regulator circuit 130 will be positive for gyro speeds below the desired speed, negative for gyro speeds above the desired speed and zero at a desired speed.

The output of speed regulator circuit 130 is fed to multiplier circuit 60 and multiplier circuit 110. Multiplier circuit 110 consists of an amplifier 111 whose gain is controlled by 112, 113 and 114. Amplifier 111 is either inverting or noninverting depending on transistor 115. Transistor 115 is switched on and off by the signal from squaring circuit 100. The output of multiplier circuit 110 is a square wave at the gyro spin frequency with a positive and negative amplitude equal to the error signal from speed regulator circuit 130. Multiplier circuit 110 controls the amount of phase 2 drive signal fed to power amplifier/filter circuit 120. Multiplier circuit 60 is identical to multiplier circuit 110 except that it controls the phase 1 drive signal fed to power amplifier/filter circuit 70.

Power amplifier/filter circuit 120, which receives its input from multiplier circuit 110, is a current amplifier consisting of components 121, 122, 123, 124, 125, 126, 127, 128, 129, 160, 161, 162, 163, 164, 165 and 166. Components 121, 122, 123, 167, 168 and 169 form a two pole low-pass filter to provide a more sinusolidal current drive to the phase two gyro coils. This increases gyro drive efficiency and reduces system noise.

The filter also produces the necessary phase shift in the drive signal which is required due to the fact that the reference coils are a fixed angle from the motor drive coils. Components 170, 171 and 172 provide the necessary compensation to assure system stability with the inductive load.

Power amplifier/filter circuit 70 is identical to power amplifier/filter circuit 120 except that it receives its input from multiplier circuit 60 and provides an output current drive to the phase 1 gyro coils.

The above description is exemplary of the principles involved and several obvious variations of the above circuit can be made by those skilled in the electrical arts.

What is claimed is:

1. A two phase sequential bipolar analog drive with closed loop speed control in a motor having a plurality of windings as a stator which interacts with a permanently magnetized gyro rotor which is free to pivot and rotate relative to the stator comprising:

means place about said stator for sensing rotation of said stator which generates a single reference signal of known phase relationship to the plurality of windings of said stator;

means for generating a plurality of gyro motor drive signals properly phased to the rotation of said gyro rotor based on said reference signal comprising:

a buffer circuit receiving said reference signal for filtering and amplifying said reference signal to a predetermined output signal from said buffer circuit;

an oscillator/squaring circuit which inputs said buffer circuit output for emitting a predetermined driving pulse when said buffer output is beneath a present threshold frequency and for squaring up said buffer circuit output when it is above said present threshold frequency;

a phase shifter circuit which inputs said buffer circuit output for changing the phase of said buffer circuit output a predetermined amount when said buffer circuit output frequency is beneath a defined limit;

a squaring circuit connected to said phase shifter circuit for squaring up said phase shifted buffer circuit output and inputting it to said stator for driving said rotor; and means for controlling the level of said plurality of gyro rotor drive signals based on said reference signal.

2. A two phased motor drive as described in claim 1 wherein said sensing means comprises a plurality of reference coils spaced in a predetermined pattern about said rotor.

3. A two phase motor drive with closed loop control as described in either of claims 1 or 2 wherein said control means comprises:

a speed regulator circuit connected between said generating means and said stator for limiting the speed of said gyro rotor by an appropriate output;

a plurality of multiplier circuits connected to said speed regulator circuits output for amplifying said gyro drive signals in the appropriate phase relation to said gyro rotor position; and a plurality of power amplifier circuits connected one each between said multiplier circuits and said plurality of windings of said stator for improving gyro rotor drive efficiency.

* * * * *